United States Patent Office 3,149,144
Patented Sept. 15, 1964

3,149,144
PROCESS FOR THE PRODUCTION OF MONO-
ALKYL PHOSPHONIC ACID DIESTERS, DI-
AMIDES, AND DIHALIDES
Clarence W. Huffman, Glenview, and Martin Hamer,
Chicago, Ill., assignors to International Minerals &
Chemical Corporation, a corporation of New York
No Drawing. Filed Sept. 13, 1962, Ser. No. 223,511
35 Claims. (Cl. 260—461)

This invention relates to an improved method for the preparation of derivatives of monoalkyl phosphonic acid. In one of its aspects this invention relates to an improved method for the preparation of esters of monoalkyl phosphonic acid. In another of its aspects this invention relates to an improved method for the preparation of amide derivatives of monoalkyl phosphonic acid. In still another of its aspects, this invention relates to an improved method for the preparation of phosphonyl dihalides.

In the past few years there has been a great deal of work done in the field of organic phosphorus compounds, particularly in the field of esters and amides of the various acids of phosphorus. These compounds have shown themselves to be quite versatile in their end uses. For example, they can be employed in insecticidal, fungicidal and germicidal formulations, as plasticisers for various plastics; ingredients in gasoline, lubricating and fuel oil additives, and for many other uses. Although the knowledge concerning the utility of organic phosphorus compounds has expanded, the commercialization of other than phosphates has not been extensive. This is due in large part to the economics involved. Many difficulties attend the known methods for the production of phosphonates. Most workers have prepared phosphite esters, $(RO)_3P$, as the important intermediate, which reacts with an alkyl halide, $R'X$, to produce a phosphonate ester $R'PO(OR)_2$.

In the preparation of organic phosphorus compounds, it is a common procedure to use as a starting material a phosphorus trihalide and to introduce an organic radical by replacement of the halide atoms attached to the phosphorus through carbon, oxygen, sulphur or nitrogen linkages. Clay, for example, disclosed the reaction of $PCl_3$ with $RCl$ in the presence of aluminum chloride to form the complex $(RPCl_3)^+(AlCl_4)^-$. J. Org. Chem., 16, 892 (1951). When the R happens to be a long chain hydrocarbon radical, the compound RCl becomes expensive and difficult to prepare. The Russian workers, Okhlobystin and Zakharkin, have reported the reaction of $PCl_3$ with trialkyl aluminum to form phosphines having varying degrees of organic substitution. Izvest. Akad Nauk. SSSR, 1006–8 (1958). U.S. Patent No. 3,036,132 to Becker makes a similar disclosure although he was primarily concerned with the reaction of phosphorus trihalides with organic alkali metal aluminum compounds.

Another factor in this picture has been the yields which are obtained in the preparation of organic phosphorus compounds. Very often the intermediate reaction products must be isolated and purified before they can be used further. This, of course, involves tedious separation and purification problems which are time consuming and costly in material losses, etc. and which deter commercial adoption unless the final product commands a price adequate to insure a reasonable profit.

In accordance with the present invention, we have discovered a method for the preparation of derivatives of monoalkyl phosphonic acids which involves the use of readily available raw materials and provides economies of processing heretofore unknown. In our process, we react a trialkyl aluminum with a phosphorus trihalide substantially according to the equation $$AlR_3 + 3PX_3 \rightarrow (RPX)^+(AlX_4)^- + 2RPX_2$$

In the above equation, R is an alkyl radical having from 2 to 24 carbon atoms and X is a halide selected from the group consisting of chlorine, bromine and iodine. The reaction is conducted in the absence of molecular oxygen and moisture, and preferably in the presence of an inert anhydrous solvent medium.

While the above reaction may possibly be suggested by the reported work of Becker and the Russians, Oklobystin and Zakharkin, in both instances these workers were concerned with recovering the trivalent phosphine formed, and neglected entirely the phosphine complex with the aluminum halide. We found that the aluminum halide-monoalkyl dihalophosphine complex or free monoalkyl dihalophosphine need not be separated before conversion to desirable organic compounds. That is, we have discovered that the complexed form in admixture with the free alklhalophosphine can be converted to derivatives of monoalkyl phosphonic acids as a mixture, and the desired organic compound recovered at the end of the process after splitting off of the aluminum halide from the complex. Further, we have unexpectedly obtained greater yields, based on starting materials, working with the mixture of complex and free compound as compared to working with all free compound or all complex. It will be seen immediately that tedious and costly intermediate separation steps are eliminated permitting the entire process, from beginning to end, to be performed with a minimum of material transfers and purifications. For example, we have converted a trialkyl aluminum to a phosphonate ester in one reaction vessel, by the successive addition of suitable reagents.

It is, therefore, an object of the present invention to provide an improved method for the preparation of derivatives of monoalkyl phosphonic acids.

It is another object of this invention to provide an improved method for the preparation of esters of monoalkyl phosphonic acids.

It is a further object of this invention to provide an improved method for the preparation of amide derivatives of monoalkyl phosphonic acids.

Still another object of this invention is to provide an improved method for the preparation of monoalkyl phosphonyl dihalides.

Additional objects of the present invention will be apparent from the description which follows.

In the practice of the present invention, the first step in the preparation of monoalkyl phosphonic acid derivatives involves the reaction between the phosphorus trihalide and a trialkyl aluminum according to the equation $$AlR_3 + 3PX_3 \rightarrow (RPX)^+(AlX_4)^- + 2RPX_2$$

In the above formula, X is a halide selected from the group consisting of chlorine, bromine and iodine. The preferred halide is chlorine because of its ready availability and low cost. R is an alkyl hydrocarbon radical having from 2 to 24 carbon atoms. Examples of the alkyl radicals include ethyl, propyl, butyl, pentyl, hexyl, heptyl, octyl, nonyl, decyl, undecyl, dodecyl, tridecyl, tetradecyl, hexadecyl, octadecyl and eicosyl. All of the R's may be alike, as for example in triethyl aluminum and trioctyl aluminum, or they may be mixed alkyl radicals, as for example, in octyl decyl tetradecyl aluminum and the like. Preferred trialkyl aluminums include triethyl aluminum, trioctyl aluminum and mixed-alkyl trialkyl aluminum. Trialkyl aluminums are readily available commercial commodities from such sources as Continental Oil Company and Texas Alkyls, Inc.

In carrying out this step, since the reactants and the products react readily with oxygen and water in the atmosphere, it is necessary to effect reaction with the exclusion of these materials as well as other reactive materials. The reaction may be effected under an atmosphere of nitrogen, helium, argon or other inert gas. The reaction is exothermic and can be effected over a broad temperature range, generally between about —50° C. and up to about 100° C., and higher if means are taken to remove the volatile materials. It is generally desirable, although not absolutely essential, to employ inert solvents or diluents in the reaction zone where they function to dissolve reacting materials in products and to absorb some of the heat released during the reaction. Especially useful solvents or diluents include unreactive hydrocarbons such as the saturated hydrocarbons and the aromatic hydrocarbons. Suitable saturated hydrocarbon solvents or diluents include the alkanes such as pentanes, hexanes or higher boiling alkanes such as n-heptane, octane, dodecane, mineral oil, or the like; cycloalkanes such as cyclopentane, cyclohexane, and alkyl cycloalkanes; aromatic hydrocarbons such as benzene, toluene, xylene and other alkyl benzenes, naphthalene, alkyl naphthalenes; chlorinated alkanes such as ethylene dichloride, methylene dichloride, and the like. The specific solvents are chosen with regard to their solvent ability, and to particular reaction conditions which are selected so that the solvent or diluent will be employed in the liquid or liquid-vapor mixture in the reaction zone.

The reaction may be effected at atmspheric pressure or super-atmospheric pressures. Ordinarily the reaction in question is not pursued with substantially pressure change, so that the selection of the desired pressure is based principally on physical considerations involved in the reaction, as, for example, the boiling point of the reaction solvent or diluent.

Because the desired organic phosphorus compound is a monoalkyl derivative, the ratio of phosphorus trihalide to aluminum trialkyl is at least 3 to 1. Under these conditions, there is generally little, if any, secondary or tertiary alkyl substitution of the phosphorus atom. While a slight excess over the 3 to 1 ratio of phosphorus trihalide to aluminum trialkyl is desirable, care should be taken that the excess is not very large. This expedient will avoid the reaction of the excess phosphorus trihalide with later reactants in the chemical processing, thus minimizing contamination in the desired end product.

In a specific embodiment of the preceding step, 1 mole proportion of triethylaluminum dissolved in dry benzene is added under a nitrogen blanket to a solution containing at least 3 mole proportions of PCl₃ dissolved in dry benzene, over a period of about 20 minutes to about 1 hour, at a temperature between about 20 and 50° C. After addition of the triethylaluminum, stirring at the same temperature is continued for a period of about 30 minutes to about 3 hours.

In the practice of the present invention, pursuing the preparation of derivatives of monoalkyl phosphonic acids, it is necessary that the phosphorus in the aluminum halide-monalkyl dihalophosphine and free monalkyl dihalophosphine formed in the preceding step be converted to the pentavalent state. This may be accomplished in several ways. For example, the mixture can be treated with sulphur in which case the resulting compound will be the complex of aluminum halide and alkyl thiophosphonyl dihalide and free alkyl thiophosphonyl dihalide. If, however, the desired end product is an oxygen analog, it is necessary that the oxidation be performed by a different method. We have found that a successful procedure is to treat the mixture of complex and free alkyl dihalophosphine with molecular halogen, such as chlorine. We have found that the oxidation under these circumstances proceeds readily. Care should be taken, however, in this oxidation step when using halogen since there is a tendency to halogenate the carbon atoms on the alkyl group. This precaution is desirable when appreciable quantities of chlorine in the final derivative is unwanted, for example, when the derivative may be intended for use as a plasticiser.

The chemistry of converting the mixture of complex and free pentavalent monoalkyl phosphorus halide formed in the halogenation step to desirable derivatives is reasonably straight-forward. For example, the compounds in the mixture can be converted to the corresponding complex and free alkyl phosphonyl dihalide by treatment with a compound capable of acting as a chalcogen donor, such as oxygen or sulphur. Examples of classes of such compounds include organic hydroxy or mercaptan derivatives such as lower aliphatic alcohols or mercaptans or aromatic compounds such as p-cresol. Specific illustrative examples of such chalcogen donors include methanol, ethanol, propanol, isopropyl alcohol, butanol, tertiary butyl alcohol, etc., methyl mercaptan, ethyl mercaptan, propyl mercaptan, sulphur, hydrogen sulphide, and the like. The foregoing materials are preferable employed in the absence of moisture. If the alkyl phosphonyl dihalide is the desired product, chalcogen donation can be accomplished by hydrolysis with water or aqueous acids such as HCl, H₂SO₄, acetic acid, etc. at low temperature in which case the aluminum halide complex of the desired alkyl phosphonyl dihalide will be broken and said alkyl phosphonyl dihalide recovered from the thus-obtained reaction mixture. If, however, the alkyl phosphonyl dihalide is only an intermediate product which is to be converted to an ester or an amide, it is preferable to carry out the conversion to the complex and the free monoalkyl phosphonyl dihalide in an anhydrous system. Obviously, the monoalkyl phosphonyl dihalide can be recoved from the anhydrous system, when desired, by breaking the complex with water.

It will be appreciated that the expression "monoalkyl phosphonyl dihalide" is intended to include both the oxygen and the sulphur analogs.

Assuming that the complex and free alkyl phosphonyl dihalides have been prepared in an anhydrous medium, alkyl phosphonate esters can be prepared therefrom by treating the reaction mixture as obtained with about 6 mole proportions of an organic monohydroxy compound having the formula R'OH wherein R' is an organic radical selected from the group consisting of aliphatic hydrocarbon, cyclo aliphatic hydrocarbon, aromatic hydrocarbon, mixed aliphatic-aromatic hydrocarbon such as alkaryl and aralkyl groups and alkyl oxyalkylene. The above hydrocarbon radicals may be saturated or unsaturated and substituted or unsubstituted, but when substituted they must be substituted with inert functional groups; that is, those groups which will not interfere with the reaction between the hydroxyl group and the halogen from the alkyl phosphonyl dihalide. Illustrative examples of R' groups include methyl, ethyl, propyl, isopropyl, butyl, amyl, hexyl, octyl, dodecyl, hexadecyl, octadecyl, and the like; olefinic and acetylenic analogs of the foregoing; cyclohexyl, cyclopentyl, methycyclohexyl, phenyl, methylphenyl, ethylphenyl, naphthyl, methylnaphthyl, ethylnaphthyl, tolyl, xylyl, methoxyethyl, ethoxyethyl, methylpolyoxyethyl, methoxypropyl, ethylpolyoxypropyl, and the like. It will be appreciated that if mixed esters are desired that a mixture of organic monohydroxy compounds can be employed in the esterification reaction.

When the esterification reaction is carried out in an anhydrous medium, the reaction product is a mixture of the desired ester as the aluminum halide complex and the free ester. The desired ester can be recovered from this mixture by treatment with water to break the aluminum halide complex. When this is done, the aluminum halide forms a hexahydrate which first appears as a precipitate which is dissolved as more water is added. The organic compounds separate, generally from the aqueous phase, and may be readily recovered therefrom and worked up in conventional ways.

In an illustrative embodiment, dicresyl ethyl phosphonate is prepared by first reacting triethylaluminum with PCl₃ as described hereinbefore. The reaction product is then treated with molecular chlorine by bubbling chlorine gas therethrough until the ethyldichlorophosphine complex and free phosphine are converted to the pentavalent state. The thus-produced reaction product is then treated with about 3 mole proportions of anhydrous tertiary butyl alcohol, at room temperature, with agitation and refluxing. The reaction mixture thus obtained is then mixed with about 6 mole proportions of p-cresol and refluxed for several hours. After cooling, the reaction mixture is treated with excess dilute aqueous caustic and the di-p-cresyl ethylphosphonate organic phase separated and the solvent removed by distillation.

In an alterative procedure for preparing the same compound, the treatment with tertiary butyl alcohol can be substituted by treatment with additional p-cresol. In this case, the excess p-cresol functions as the oxygen donor in converting the alkyl pentavalent phosphorus halide to the phosphonyl derivative.

In the preparation of an amide derivative of alkyl phosphonic acid, the reaction mixture obtained by the reaction between the aluminum trialkyl and PX₃ is preferably treated with halogen as hereinbefore described to effect oxidation to the pentavalent state. The reaction mixture thus obtained is treated with a chalcogen donor in the manner described hereinbefore to convert the same to the alkyl phosphonyl dihalide complex and free compound. Since the latter is only an intermediate, the conversion is effected in an anhydrous medium. The resulting reaction mixture is then treated with at least 6 mole proportions of an organic monoamine having the formula R″₂NH, and preferably an excess over the 6 mole proportions to accommodate the fact that the HCl formed is taken up by the free amine reactant, thus rendering the amine unavailable for reaction with the halogen groups attached to the phosphorus atom. R″₂NH is an organic monoamine of less than tertiary substitution wherein R″ is selected from a group consisting of aliphatic hydrocarbon, cycloaliphatic hydrocarbon, aromatic hydrocarbon, mixed aliphatic aromatic hydrocarbon, divalent heterocyclic wherein N of the amine is included in the heterocyclic nucleus, and hydrogen, not more than one R″ being hydrogen. The hydrocarbon radicals may be saturated or unsaturated and substituted or unsubstituted, but when substituted, the substituted group must be inert to the reaction between the amide and the phosphonyl dihalide. Thus, for example, hydroxyl substitution is prohibited.

Specific illustrations of R″ are identical with those given for R′ of the R′OH as described hereinbefore, with the exception of the alkyl oxyalkylene illustrations which are omitted. Specific illustrations of heterocyclic amines include morpholine, substituted morpholine, piperidine, substituted piperidine, pyrrolidine, and the like. Preferred amines are alkyl primary and secondary amines having from 1 to 18 carbon atoms, such as dimethyl amine, diethyl amine, hexyl amine, octyl amine, dodecyl amine, octadecyl amine, aniline, N-methylaniline and the like.

In an illustrative embodiment ethyl bis-(N,N′-diethyl) phosphonamide is prepared by first reacting triethylaluminum with PCl₃ as described hereinbefore. The reaction product mixture is then treated with about 3 mole proportions of molecular chlorine followed by treatment with about 3 mole proportions of anhydrous methanol, at room temperature with agitation, to convert the mixture to the complex and free ethyl phosphonyl dichloride. The reaction mixture thus obtained is admixed with about 12 mole proportions of diethyl amine and stirred for about an hour. The reaction mixture is treated with excess water and the ethyl bis-(N,N′-diethyl) phosphonamide organic phase separated and the solvent removed therefrom.

The following examples are intended to illustrate the underlying principles of the present invention and are not to be interpreted as unduly limiting thereof. The reported yields are based on the amount of trialkyl aluminum employed. All temperatures are ° C. unless otherwise stated.

EXAMPLE 1.—ETHYLPHOSPHONYL DICHLORIDE

Phosphorus trichloride, 41.2 g. (0.30 mole), was dissolved in 150 ml. dried ethylene dichloride in a one-liter flask, equipped in the usual manner. Triethylaluminum, 11.6 g. (0.10 mole), dissolved in 80 ml. ethylene dichloride, was added in 1 hour at 35–45° under nitrogen. The reaction mixture was heated an additional one hour at the same temperature, then cooled and stoppered under nitrogen overnight. The clear yellow solution was cooled in an ice bath to 0° and chlorine bubbled in at 85 ml. per min. for 80 minutes (3.0 units on Flowrator 02F-1/8-12-5/36). The temperature was kept between 0 and 5° during the chlorine addition. The ice bath was replaced by a Dry Ice and trichloethylene bath and the temperature of the reaction mixture brought down to −30°. A 50% excess of water (24.3 ml.) was added in 10 min. at −20 to −30° and the mixture stirred at this temperature for an additional 15 minutes. The "slushy" mixture was filtered cold through a sintered glass funnel (medium) with difficulty, requiring about four hours. The filtrate was heated and stirred under vacuum to 72° at 52 mm. to remove the solvent. The stripped product was distilled through a Claisen head, and 15.4 g. (35%) of ethylphosphonyl dichloride, $n_D^{26}$ 1.4642, were collected at 53–60° at 4 mm.

EXAMPLE 2.—DI-p-CRESYL ETHYLPHOSPHONATE

Triethylaluminum, 11.4 g. (0.10 mole), dissolved in dried ethylene dichloride, was added to phosphorous trichloride, 41.2 g. (0.30 mole), in dried benzene, over a one hour period under nitrogen at 35 to 45°. After an additional one hour at the same temperature, the reaction mixture was cooled, and chlorine bubbled in at 10 to 15° and at 200 ml. per minute until excess chlorine was observed. The mixture was stirred and allowed to warm to room temperature. Para-cresol, 116.6 g. (1.1 mole), dissolved in 75 ml. of dry ethylene dichloride, was added and the mixture heated at reflux for ten hours. The cooled reaction mixture was treated with 100 ml. of water at 15 to 25°, and then agitated twice with 85 ml. portions of 5% sodium hydroxide. After washing with water until neutral, the benzene was removed in vacuo and the product distilled, collecting 43.5 g. (50%) of di-p-cresyl ethylphosphonate, 140–150° (0.03 mm.), $n_D^{25}$ 1.5420.

EXAMPLE 3.—DI-p-CRESYL ETHYLPHOSPHONATE

This was carried out as in Example 2 using only benzene as the solvent and with the following variations. After the chlorine addition, methanol 8.2 g. (0.255 mole), was added and the reaction mixture stirred at 20 to 25° for thirty minutes. Para-cresol, 82.6 g. (0.765 mole), in 100 ml. benzene, was then added and the mixture heated at reflux for ten hours. The reaction mixture was worked-up as in Example 2. Distillation gave 37.4 g. (43%) of di-p-cresyl ethylphosphonate.

EXAMPLE 4.—DIOCTYL ETHYLPHOSPHONATE

Triethylaluminum, 11.4 g. (0.10 mole), in 80 ml. benzene, was added to phosphorous trichloride, 41.2 g. (0.30 mole), in 150 ml. benzene, at 35 to 45° over a one hour period under nitrogen. The reaction mixture was heated an additional one hour at the same temperature. Chlorine was bubbled in at 200 ml. per minute at 10 to 15° until an excess was observed. Methanol 8.2 g. (0.255 mole), was then added dropwise and the reaction mixture stirred at 15–25° for one-half hour. Octanol, 103.3 g.

(0.795 mole), was added in 100 ml. benzene at 15 to 25° in 40 minutes under slight vacuum to remove HCl. Stirring was continued for six hours at 20 to 25° under slight vacuum. The reaction mixture was treated with 100 ml. of water at 15 to 25°, separated, and washed again with water, 5% $Na_2O_3$ solution, and then water. The benzene was removed in vacuo and the excess octanol by steam distillation. Distillation of the product gave 36.6 g. (37%) of dioctyl ethylphosphonate, boiling 150–155° at 0.03 mm., $n_D^{27}$ 1.4444.

EXAMPLE 5.—DIOCTYL MIXED-ALKYL PHOSPHONATES

Mixed aluminum trialkyls of average molecular weight 391 (Continental Oil Company), 78.2 g. (0.20 mole), dissolved in 150 ml. benzene, were added to phosphorous trichloride, 82.4 g. (0.60 mole), in 300 ml. benzene over a one hour period at 34 to 45° under nitrogen. The reactants were heated at the same temperature an additional one hour. Chlorine was bubbled in at 200 ml. per minute at 10 to 15° until an excess was observed (2 hours). Methanol, 16.3 g. (0.51 mole), was added during 15 minutes and the mixture heated at 40 to 45° for 30 minutes. n-Octanol, 207.0 g. (1.59 moles), was added in 40 minutes while cooling to 20° under slight vacuum. The reaction mixture was stirred at 20 to 25° under slight vacuum to remove the resultant hydrogen chloride for ten hours. The product was then treated by stirring with 200 ml. water portions at 15 to 25° twice, followed by a 2% sodium hydroxide wash, and then water. The benzene was stripped off under vacuum and the excess octanol removed by steam distillation. After removal of the residual water by vacuum stripping to 80° at 20 mm., the product was distilled in a molecular still (Vacu-Film Processor) at 165 to 175° and 50 to 80µ, giving 152.4 g. (60%) of dioctyl mixed-alkyl phosphonates.

EXAMPLE 6.—DI-p-CRESYL MIXED-ALKYL PHOSPHONATES

Mixed aluminum trialkyls of average molecular weight 397 (Continental Oil Company), 39.7 g. (0.10 mole), dissolved in 80 ml. ethylene dichloride, were added to phosphorous trichloride, 41.2 g. (0.30 mole), in 150 ml. ethylene dichloride, at 35 to 45° under nitrogen in one hour. The clear solution was heated another one hour at the same temperature. Chlorine was bubbled in at 200 ml. per minute and at 10 to 15° until an excess was detected. The reaction mixture was stirred while slowly allowing it to warm up to room temperature, at which point p-cresol, 116.6 g. (1.1 mole), dissolved in 100 ml. ethylene dichloride, was added. The reaction mixture was refluxed for a period of ten hours. The reaction mixture was cooled, stirred with 300 ml. of 10% sodium hydroxide solution, and then washed twice with water. After stripping the solvent under vacuum, the excess cresol was distilled off under vacuum. The product was chilled and 11.6 g. of by-product tri-p-cresyl phosphate crystallized out (10%). The resulting di-p-cresyl mixed-alkyl phosphonates weighed 96.8 g. (84%).

EXAMPLE 7.—DI-m,p-CRESYL MIXED ALKYL PHOSPHONATES

Mixed aluminum trialkyls of average molecular weight 391 (Continental Oil Company), 39.1 g. (0.10 mole), dissolved in 80 ml. benzene, were added to phosphorous trichloride, 41.2 g. (0.30 mole), in 150 ml. benzene, at 35 to 45° in one hour under nitrogen. The reaction mixture was heated at the same temperature for another one hour. Chlorine was then bubbled in at 200 ml. per minute at 10 to 15° until an excess was observed. Stirring was continued for three hours at 10 to 15° and then nitrogen bubbled in to dispel any excess chlorine. Isopropyl alcohol, 15.3 g. (0.255 mole), was added and the mixture heated at 40 to 45° for one-half hour. Mixed, m,p-cresols, 83.8 g. (0.765 mole), in 100 ml. benzene, were added and the solution heated at reflux for ten hours. The cooled reaction mixture was treated twice with water at 15 to 25° and extracted with 5% sodium hydroxide and then 5% potassium hydroxide in 50% aqueous ethanol. The benzene layer was then washed with water until neutral. After stripping the solvent under vacuum to 90° at 60 mm., the product was distilled in a molecular still (Vacu-Film Processor) at 200° (50 to 60µ). The light yellow distillate, di-m,p-cresyl mixed-alkylphosphonates, weighed 101.2 g. (88%). Analysis showed the product to contain 5.5% chlorine.

EXAMPLE 8.—DI-m,p-CRESYL MIXED-ALKYLPHOSPHONATES

This preparation was carried out as in Example 7; however, instead of adding chlorine at 200 ml. per minute until an excess was observed, the calculated quantity was metered in at 85 ml. per minute at 0 to 5° for 79 minutes. The remainder of the process was identical and resulted in 95.7 g. (83%) of distilled di-m,p-cresyl mixed-alkylphosphonates. The chlorine content of the faintly-yellow product was 0.3%.

EXAMPLE 9.—DI-p-CRESYL OCTYLPHOSPHONATE

Trioctylaluminum, 28.3 g. (0.08 mole), was dissolved in 80 ml. benzene and added to a solution of phosphorous trichloride, 33.0 g. (0.24 mole), in 150 ml. benzene, in one hour at 35 to 45° under nitrogen. The reaction mixture was heated at 35–45° for another one hour. Chlorine was then bubbled in at 200 ml. per minute at 10 to 15° until an excess was observed (one hour). Methanol, 6.5 g. (0.20 mole), was added and the flask contents were stirred under slight vacuum (to remove HCl) at 15 to 20° for one half hour. Para-cresol, 66.0 g. (0.61 mole), dissolved in 100 ml. benzene, was added and the mixture heated at reflux for ten hours. After working up in the usual manner, the solvent was stripped off under vacuum and the tri-p-cresylphosphate (8.0 g.) which crystallized out was filtered off. The filtrate was distilled in a molecular still (Vacu-Film Processor) at 185 to 200° (20–30µ), collecting 55.7 g. (63%) of di-p-cresyl octylphosphonate.

EXAMPLE 10.—ETHYLTHIOPHOSPHONYL DICHLORIDE

Triethylaluminum, 11.6 g. (0.10 mole), was dissolved in 80 ml. of benzene and added to phosphorous trichloride, 41.2 g. (0.30 mole), in 150 ml. benzene in one hour at 35–45° under nitrogen. The reaction mixture was heated an additional one hour at the same temperature. Sulfur (Fisher USP precipitated powder), 9.6 g. (0.30 mole), was added in ten minutes and the mixture heated at 35–45° for three hours. The clear yellow solution was cooled in an ice bath and water, 13.0 g. (0.72 mole, 20% excess), was added at 0 to 5° in ten minutes. Stirring was continued for another fifteen minutes at the same temperature, and then the hydrated aluminum chloride was filtered off. The solvent was stripped off from the filtrate under vacuum and the unreacted sulfur which deposited was removed by filtration. The filtrate was vacuum distilled giving 9.2 g. (19%) of ethylthiophosphonyl dichloride, boiling at 46–50° at 4 mm.; $n_D^{28}$ 1.5406. Calculated for $C_2H_5PSCl_2$: 19.0% P, 19.6% S; found: 19.1% P, 19.6% S.

EXAMPLE 11.—ETHYL BIS-(N,N'-DIETHYL) PHOSPHONAMIDE

Triethylaluminum, 0.10 mole, dissolved in 75 ml. of benzene, is added to a benzene solution of phosphorous trichloride, 0.30 mole. The addition of the triethylaluminum is carried out in one hour at 35 to 45°, in a nitrogen atmosphere, and then the mixture is heated an additional one hour at the same temperature. After cooling, chlorine is bubbled in at 0 to 5° until an excess is observed. Methanol, 0.30 mole, is added and the mixture is stirred at 20 to 25° for 30 minutes. A solution of diethylamine, 1.2 moles, in benzene is added, keeping the temperature at 10 to 25°. The mixture is stirred at this temperature for another one hour, and then the precipitate is filtered and washed with benzene. The filtrate is then treated with cold water, the organic layer separated, stripped of the solvent, and the product distilled to give ethyl bis-(N,N'-diethyl) phosphonamide.

EXAMPLE 12.—ALKYL BIS-(N,N'-ETHYL-N,N'-PHENYL) PHOSPHONAMIDE

Mixed-alkyl trialkylaluminum, 0.10 mole, dissolved in 100 ml. of benzene, is added to phosphorous trichloride in 150 ml. of benzene at 35 to 45° in one hour under nitrogen. The mixture is stirred another one hour at 35 to 45°. The solution is cooled, and chlorine, 0.30 mole, is bubbled in at 0 to 5°. Isopropyl alcohol, 0.30 mole, is then added, allowing the temperature to rise to 30–35° and the reactants maintained at this tempreature for another thirty minutes. N-ethylaniline, 1.2 moles, in 100 ml. of benzene, is added while keeping at 10 to 20°. The mixture is then stirred at 20–25° for two hours and the precipitate removed by washing with water. The solvent is removed leaving ethyl bis-(N,N'-ethyl-N,N'-phenyl) phosphonamide.

EXAMPLE 13

The following runs were conducted to determine the effect of aluminum chloride complex formation on the yield of di-p-cresyl ethyl-phosphonate:
(A) Totally-uncomplexed intermediate

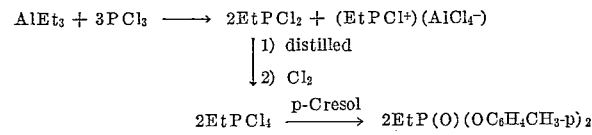

(B) Partially-complexed intermediate

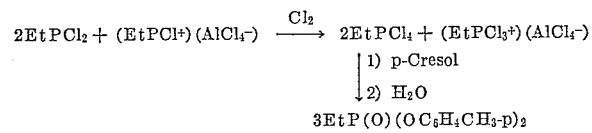

(C) Totally-complexed intermediate

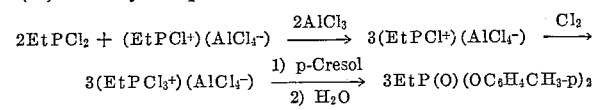

The following table gives the yields of final product obtained from each method.

| Degree of complexing: | Percent yield EtP(O)(OC$_6$H$_4$CH$_3$-p)$_2$ |
|---|---|
| (A) Totally-uncomplexed | 9 |
| (B) Partialy-complexed | 50 |
| (C) Totally-complexed | 46 |

The mixture of complexed and uncomplexed intermediates gave a higher yield of phosphonate ester than did either the totally-uncomplexed or totally-complexed intermediates.

*Description*

(A) UNCOMPLEXED MATERIAL (3416–35, -39): Triethylaluminum, 27.2 g. (0.23 mole), dissolved in 120 ml. dry benzene in a dry box under nitrogen, was added to a solution of phosphorous trichloride, 94.8 g. (0.69 mole), in 300 ml. dry benzene. The addition was carried out over a one hour period under nitrogen at 35–45°. Stirring was continued for another one hour under the same conditions. After standing stoppered overnight, the distillable material was collected by heating up to 120° at 43 mm. presssure. The material collected in this manner was then redistilled through a 16″ glass-helix-packed column. A total of 11.4 g. (19%) of C$_2$H$_5$PCl$_2$ was collected in 2 fractions: (a) 7.5 g., 110°, $n_D^{27}$ 1.4928; (b) 3.9 g., 35–36° at 47 mm., $n_D^{27}$ 1.4937. The ethyldichloro phosphine was dissolved in 100 ml. dry ethylene dichloride and chlorine was bubbled in at 5–10° until excess chlorine was observed. After stirring at the same temperature for an additional 30 minutes, p-cresol, 33.0 g. (0.31 mole, 20% excess), dissolved in 100 ml. dry ethylene dichloride, was added. The mixture was refluxed (85° maximum) for 10 hours, cooled, and then stirred with 85 ml. of water at 15–25° for 15 minutes. After separating the aqueous layer, the product was treated with water a second time. This was followed by extraction with 85 ml. of 5% NaOH solution and then with 85 ml. of 5% KOH in 50% aqueous ethanol. The benzene layer was water-washed until neutral and then stripped on a steam bath under vacuum to 90° at 42 mm., leaving 24.7 g. of dark amber oil. This material was distilled and 17.5 g. (9%) of di-p-cresyl ethylphosphonate was collected, boiling from 145–151° at 0.07 mm.; $n_D^{24}$ 1.5420.

(B) PARTIALLY-COMPLEXED MATERIAL (3377–30): Triethylaluminum, 11.4 g. (0.10 mole), dissolved in 80 ml. benzene, was added to a solution of phosphorous trichloride, 41.2 g. (0.30 mole), in 150 ml. ethylene dichloride. The addition was carried out over one hour at 35–45° under nitrogen. Stirring was continued an additional one hour at the same temperature. After standing over night, the flask contents were cooled and chlorine was bubbled in at 200 cc./min. and at 10–15° until excess chlorine was detected (110 minutes). The mixture was stirred and allowed to slowly warm up to room temperature, at which point p-cresol, 116.6 g. (1.08 mole), dissolved in 75 ml. ethylene dichloride was added. The mixture was heated at reflux for ten hours. The reaction product was washed and extracted as in the previous example, and distilled, yielding 43.5 g. (50%) of C$_2$H$_5$P(O)(OC$_6$H$_4$CH$_3$-p)$_2$.

(C) TOTALLY-COMPLEXED MATERIAL (3416–42): The reaction of triethylaluminum and phosphorous trichloride was carried out as in the preceding example (3377–30), using benzene as the solvent. Anhydrous aluminum chloride, 26.7 g. (0.20 mole), was added with cooling, and then chlorine was bubbled in at 10–15° until an excess was observed. After stirring for two hours at 5–15°, the p-cresol was added as a solution in 100 ml. benzene. The mixture was heated at reflux for 10 hours, cooled, and worked up in the usual manner. A total of 40.2 g. (46%) distilled product was obtained. Calculated for C$_{16}$H$_{19}$O$_3$P: 10.7% P; found: 10.6% P.

While this invention has been described in terms of its preferred embodiments and modifications, it will be appreciated that changes can be made without departing from the spirit and scope of the invention.

We claim:
1. A method for the preparation of monoalkyl phosphonic acid derivatives selected from the group consisting of monoalkyl phosphonic acid diesters and monoalkyl phosphonic acid diamides which comprises reacting in an anhydrous medium in the absence of molecular oxygen one mole proportion of an aluminum trialkyl having the formula AlR$_3$ wherein R is an alkyl group having from 2 to 24 carbon atoms with at least 3 mole proportions of a phosphorus trihalide having the formula PX$_3$ wherein X is a halogen selected from the group consisting of chlorine, bromine and iodine to produce a reaction mixture containing aluminum halide-monoalkyl dichlorophosphine complex and free monoalkyl dichlorophosphine; treating the thus-obtained mixture with at least 3 mole proportions of molecular X$_2$ to convert the phosphorus in the complexed phosphine and free phosphine to the pentavalent state; treating the thus obtained reaction mixture with a compound capable of acting as donor of a chalcogen selected from the group consisting of oxygen and sulfur to replace 2 atoms of halogen on said pentavalent phosphorus in said complex and free compound to convert the aforementioned mixture to a mixture of aluminum halide-monoalkyl phosphonyl dihalide complex and free monoalkyl phosphonyl dihalide; reacting the thus-obtained reaction mixture with at least 6 mole proportions of a compound selected from the group consisting of organic monohydroxy compounds having the formula R'OH, and monoamines of less than tertiary substitution having the formula R''$_2$NH, wherein in said first formula R' is a radical selected from the group consisting of aliphatic hydrocarbon, cycloaliphatic hydrocarbon, aromatic hydrocarbon, and alkyl oxyalkylene, and in said second formula R'' is a radical selected from the group consisting of aliphatic hydrocarbon, cycloaliphatic hydrocarbon, aromatic hydrocarbon, divalent heterocyclic wherein the N atom is part of the heterocyclic nucleus, and hydrogen, no more than one R'' being hydrogen, to form a reaction mixture containing corresponding aluminum halide-phosphonic acid derivative complex and corresponding free phosphonic acid derivative; treating the thus-obtained reaction mixture with water to break the aluminum halide complex; and recovering from the reaction mixture a monoalkyl phosphonic acid derivative selected from the group consisting of corresponding monoalkyl phosphonic acid diesters and corresponding monoalkyl phosphonic acid diamides.

2. A method according to claim 1 wherein X is chlorine.

3. A method according to claim 1 wherein the chalcogen donor compound is a lower alkyl monohydric alcohol.

4. A method according to claim 3 wherein the lower monohydric alcohol is methanol.

5. A method according to claim 3 wherein the lower monohydric alcohol is isopropyl alcohol.

6. A method for the preparation of monoalkyl phosphonic acid diester which comprises reacting in an anhydrous medium in the absence of molecular oxygen one mole proportion of a trialkyl aluminum having the formula AlR$_3$ wherein R is an alkyl group having from 2 to 24 carbon atoms, with at least 3 mole proportions of PCl$_3$ to form a reaction mixture containing aluminum chloride-monoalkyldichlorophosphine complex and free monoalkyldichlorophosphine; treating the thus obtained reaction mixture with at least 3 mole proportions of molecular chlorine to convert the phosphorus in the complex and in the free phosphine to the pentavalent state; treating the thus-obtained reaction mixture with a compound capable of acting as a donor of a chalcogen selected from the group consisting of oxygen and sulfur to replace 2 atoms of halogen on said pentavalent phosphorus in said complex and free compound to convert the complex and free monoalkyl phosphorus polyhalide to the corresponding aluminum chloride-monoalkyl phosphonyl dichloride complex and free monoalkyl phosphonyl dichloride; treating the thus-obtained reaction mixture with at least 6 mole proportions of an organic monohydroxy compound having the formula R'OH wherein R' is a radical selected from the group consisting of aliphatic hydrocarbon, aromatic hydrocarbon, cycloaliphatic hydrocarbon, and alkyloxyalkylene to produce a reaction mixture containing aluminum chloride-monoalkyl phosphonic acid diester complex and free monoalkyl phosphonic acid diester; treating the thus-obtained reaction mixture with water to break the aluminum chloride complex; and recovering from the reaction mixture a monoalkyl phosphonic acid diester.

7. A method according to claim 6 wherein the aluminum trialkyl is triethylaluminum.

8. A method according to claim 6 wherein the aluminum trialkyl is trioctylaluminum.

9. A method according to claim 6 wherein the trialkyl aluminum is a mixed-alkyl trialkyl aluminum.

10. A method according to claim 6 wherein the chalcogen donor compound is a lower alkyl monohydric alcohol.

11. A method according to claim 10 wherein the lower alkyl monohydric alcohol is methanol.

12. A method according to claim 10 wherein the lower alkyl monohydric alcohol is isopropanol.

13. A method according to claim 6 wherein R' is an aliphatic hydrocarbon radical having from 1 to 16 carbon atoms.

14. A method according to claim 6 wherein R' is a monocyclic aryl hydrocarbon radical.

15. A method according to claim 6 wherein R'OH is octyl alcohol.

16. A method according to claim 6 wherein R'OH is a cresol.

17. A method for the preparation of dicresyl ethyl phosphonate which comprises reacting in dry benzene in the absence of molecular oxygen one mole proportion of triethylaluminum with at least 3 mole proportions of phosphorus trichloride to produce a reaction mixture containing aluminum chloride-ethyl dichlorophosphine complex and free ethyl dichlorophosphine; treating the reaction mixture with at least 3 mole proportions of molecular chlorine to convert the phosphorus in the aluminum chloride complex and in the free phosphine to the pentavalent state; treating the thus-obtained reaction mixture with about 3 mole proportions of methyl alcohol to produce a reaction mixture containing an aluminum chloride-ethyl phosphonyl dichloride complex and free ethyl phosphonyl dichloride; reacting the thus-obtained reaction mixture with at least 6 mole proportions of p-cresol to produce a reaction mixture containing aluminum chloride-dicresyl-ethyl phosphonate complex and free dicresyl ethyl ethylphosphonate; treating the thus-obtained reaction mixture with water to break the aluminum chloride complex; and recovering di-p-cresyl ethyl phosphonate from the mixture.

18. A method for the preparation of a monoalkyl phosphonic acid diamide which comprises reacting in an anhydrous medium in the absence of molecular oxygen one mole proportion of a trialkyl aluminum having the formula AlR$_3$ wherein R is an alkyl radical having from 2 to 24 carbon atoms with at least 3 mole proportions of a phosphorus trihalide having the formula PX$_3$ wherein X is selected from the group consisting of chlorine, bromine and iodine to produce a reaction mixture containing aluminum halide-monoalkyl dihalophosphine complex and free monoalkyl dihalophosphine; treating the thus-obtained reaction mixture with at least 3 mole proportions of molecular X$_2$ to convert the phosphorus in the phosphine complex and free phosphine to the pentavalent state; treating the thus-obtained reaction mixture with a compound capable of acting as donor of a chalcogen selected from the group consisting of oxygen and sulfur to replace 2 atoms of halogen on said pentavalent phosphorus in said complex and free compound to produce a reaction mixture containing aluminum halide-monoalkylphosphonyl dihalide complex and free monoalkylphosphonyl dihalide; reacting the thus-obtained reaction mixture with at least 6 mole proportions of an organic monoamine having the formula R''$_2$NH wherein R'' is a radical selected from the group consisting of aliphatic hydrocarbon, aromatic hydrocarbon, cycloaliphatic hydrocarbon, hydrogen and divalent heterocyclic wherein the N atom is part of the heterocyclic nucleus, no more than one R'' being hydrogen, to produce a reaction mixture containing corresponding aluminum halide-monoalkyl phosphonic acid diamide complex and corresponding free monoalkyl phosphonic acid diamide; treating the thus-obtained reaction mixture with water to break the aluminum halide complex; and recovering from the mixture monoalkyl phosphonic acid diamide.

19. A method according to claim 18 wherein R is a mixture of alkyl radicals.

20. A method according to claim 18 wherein the trialkyl aluminum is triethylaluminum.

21. A method according to claim 18 wherein the chalcogen donor compound is a lower alkyl monohydric alcohol.

22. A method according to claim 18 wherein the chalcogen donor compound is methyl alcohol.

23. A method according to claim 18 wherein the chalcogen donor compound is isopropyl alcohol.

24. A method according to claim 18 wherein R''$_2$NH is a primary or secondary alkyl amine having from 1 to 18 carbon atoms.

25. A method according to claim 18 wherein R''$_2$NH is diethyl amine.

26. A method according to claim 18 wherein X is chlorine.

27. A method for the preparation of ethyl bis-(N,N'-diethyl) phosphonamide which comprises reacting in anhydrous benzene in the absence of molecular oxygen one mole proportion of triethylaluminum with at least 3 mole proportions of phosphorus trichloride to form a reaction mixture containing aluminum chloride-ethyl dichlorophosphine and free ethyl dichlorophosphine; treating the reaction mixture with at least 3 mole proportions of molecular chlorine to convert the phosphorus in the complex and free phosphine to the pentavalent state; treating the thus-obtained reaction mixture with about 3 mole proportions of tertiary butyl alcohol to produce a mixture containing aluminum chloride-ethyl phosphonyl dichloride complex and free ethyl phosphonyl dichloride; treating the thus-obtained reaction mixture with about 12 mole proportions of diethyl amine to produce a reaction mixture containing aluminum chloride-ethyl diethyl phosphonamide complex and free ethyl bis(diethyl) phosphonamide; treating the thus-obtained reaction mixture with water to break the aluminum chloride complex; and recovering ethyl bis-(N,N'-diethyl) phosphonamide from the mixture.

28. A method for the preparation of a monoalkyl phosphonyl dihalide which comprises reacting in an anhydrous medium in the absence of molecular oxygen one mole proportion of a trialkyl aluminum having the formula AlR$_3$ wherein R is an alkyl radical having from 2 to 24 carbon atoms with at least 3 mole proportions of a phosphorus trihalide having the formula PX$_3$ wherein X is selected from the group consisting of chlorine, bromine and iodine to produce a reaction mixture containing aluminum halide-monoalkyl dihalophosphine complex and free monoalkyl dihalophosphine; treating the thus-obtained reaction mixture with at least 3 mole proportions of molecular X$_2$ to convert the phosphorus in the phosphine complex and free phosphine to the pentavalent state; treating the thus-obtained reaction mixture with a compound capable of acting as a donor of a chalcogen selected from the group consisting of oxygen and sulfur to replace two atoms of halogen on said pentavalent phosphorus in said complex and free compound to produce monoalkyl phosphonyl dihalide, said complex being broken when said chalcogen donor is in an aqueous state; and recovering monoalkyl phosphonyl dihalide from the thus-obtained reaction mixture.

29. A method according to claim 28 wherein AlR$_3$ is triethylaluminum.

30. A method according to claim 28 wherein AlR$_3$ is trioctylaluminum.

31. A method according to claim 28 wherein AlR$_3$ is a mixed-alkyl trialkyl aluminum.

32. A method according to claim 28 wherein X is chlorine.

33. A method according to claim 28 wherein the chalcogen donor is a lower alkyl monohydric alcohol.

34. A method according to claim 28 wherein the chalcogen donor is water.

35. A method for the preparation of ethyl phosphonyl dichloride which comprises reacting in an anhydrous medium in the absence of molecular oxygen one mole proportion of triethylaluminum with about 3 mole proportions of PCl$_3$ to produce a reaction mixture containing aluminum chloride-ethyl dichlorophosphine complex and free ethyl dichlorophosphine; treating the thus-obtained reaction mixture with about 3 mole proportions of chlorine to convert the phosphorus in said complex and free phosphine to the pentavalent state; treating the thus-obtained reaction mixture with water; and recovering ethyl phosphonyl dichloride.

References Cited in the file of this patent
UNITED STATES PATENTS

| | | |
|---|---|---|
| 2,137,792 | Woodstock | Nov. 22, 1938 |
| 3,036,132 | Becker | May 22, 1962 |